Patented Nov. 27, 1928.

1,693,447

UNITED STATES PATENT OFFICE.

GEORG KRÄNZLEIN, KARL ZAHN, PAUL OCHWAT, AND MARTIN CORELL, OF HOCHST-ON-THE-MAIN, GERMANY, ASSIGNOR TO GRASSELLI DYESTUFF CORPORATION, OF NEW YORK, N. Y., A CORPORATION OF DELAWARE.

DERIVATIVES OF DIBENZPYRENEQUINONE AND PROCESS OF PREPARING THE SAME.

No Drawing. Application filed December 28, 1926, Serial No. 157,609, and in Germany December 30, 1925.

We have found that the Bz-2-aroylhydroxybenzanthrones and the substitution products thereof which possess free peri-positions in the naphthalene nucleus can be converted into hydroxy compounds of dibenzpyrenequinone by treating them with acid condensing agents. Thus, for instance by melting the Bz-2-benzoylhydroxybenzanthrone with aluminium chloride there is obtained the 1-hydroxy 3.4.8.9-dibenzpyrenequinone according to the following scheme:

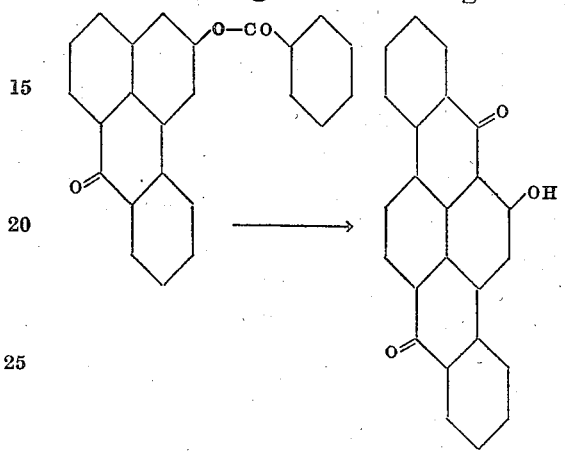

The products thus obtained are partly vat dyestuffs, per se, partly valuable intermediate products for preparing vat dyestuffs. By etherifying the hydroxy groups there are, for instance, obtained valuable yellow to orange-yellow vat dyestuffs.

The following examples serve to illustrate our invention, but they are not intended to limit it thereto, all parts being by weight:

1. 10 parts of Bz-2-benzoylhydroxybenzanthrone are introduced at 180° C. into a molten mixture of 50 parts of aluminium chloride and 10 parts of sodium chloride and the whole is heated for half an hour to 220–240° C. while stirring. After cooling, the molten mass which is in the form of a cake is comminuted and extracted by boiling it with dilute hydrochloric acid. The product thus obtained is, when dry, a reddish-brown powder, which is almost insoluble in organic solvents, but soluble in concentrated sulfuric acid to a reddish-violet solution. It gives with hydrosulfite a cherry-red vat from which cotton is dyed a deep reddish-brown tint. When the material is dabbed with an acid the color changes to yellow.

10 parts of the 1-hydroxy-3.4.8.9-dibenzpyrenequinone thus obtained are heated together with 100 parts of nitrobenzene, 5 parts of sodium carbonate and 10 parts of para-tolune-sulfonic acid-methyl ester for 6 hours to 180° C. boiled for a short time and then filtered. On cooling, the 1-methoxy-3.4.8.9-dibenzpyrenequinone separates in the form of golden yellow crystals, which are filtered off by suction, washed with alcohol and dried. The resulting product is soluble only in organic solvents of a high boiling point to a yellowish-brown solution, in concentrated sulfuric acid to a bluish-red solution. It gives with hydrosulfite a cherry-red vat from which cotton is dyed fast yellow tints.

The Bz-2-benzoylhydroxybenzanthrone above referred to is prepared from Bz-2-hydroxybenzanthrone by treating it with benzoylchloride in an alkaline solution. It forms, when recrystallized from chlorobenzene, yellow cystals, melting at 215–216° C. The color of its solution in concentrated sulfuric acid is reddish-brown with a brown fluorescence.

2. If the para-toluenesulfonic acid-methyl ester used in the foregoing example is replaced by the corresponding ethyl ester, there is obtained the 1-ethoxy-3.4.8.9- dibenzpyrenequinone, the properties of which are similar to those of the methyl derivative described in Example 1.

3. If the benzoate of the Bz-2-hydroxbenzanthrone used in Example 1 is replaced by the para-toluic acid ester of the Bz-2-hydroxy-benzanthrone and the further operations are carried out as indicated in Example 1, the 1-hydroxy-3.4-benz-8.9-methylbenzpyrenequinone of the following formula:

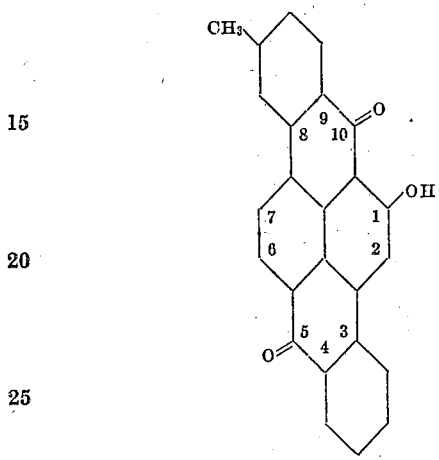

is obtained the properties of which are similar to those of the hydroxydibenzpyrenequinone described in Example 1. By alkylating this product fast yellow vat dyestuffs are obtained which possess substantially the same properties as the dyestuffs prepared according to Example 1.

The para-toluic acid ester of the Bz-2-oxybenzanthrone is prepared by heating equal parts of para-toluic acid chloride and Bz-2-hydroxybenzanthrone to 160° C.; it forms, when recrystallized from chlorobenzene, yellowish-brown crystals melting at 212–213° C. being soluble in concentrated sulfuric acid to a brownish-red solution with a brown fluorescence.

We claim:

1. In a process of preparing derivatives of dibenzpyrenequinone, the step, which comprises treating a Bz-2-aroylhydroxybenzanthrone possessing free peri-positions in the naphthalene nucleus with acid condensing agents.

2. In a process of preparing derivatives of dibenzpyrenequinone, the step which comprises treating a Bz-2-aroylhydroxybenzanthrone possessing free peri positions in the naphthalene nucleus with acid condensing agents at an elevated temperature.

3. In a process of preparing derivatives of dibenzpyrenequinone, the step which comprises treating a Bz-2-aroylhydroxybenzanthrone possessing free peri positions in the naphthalene nucleus with acid condensing agents and then treating the primarily formed derivative of dibenzpyrenequinone with alkylating agents.

4. In a process of preparing derivatives of dibenzpyrenequinone, the step which comprises treating a Bz-2-aroylhydroxybenzanthrone possessing free peri positions in the naphthalene nucleus with acid condensing agents at an elevated temperature and then treating the primarily formed derivative of dibenzpyrenequinone with alkylating agents.

5. In a process of preparing derivatives of dibenzpyrenequinone, the step which comprises treating with an acid condensing agent a compound of the following formula:

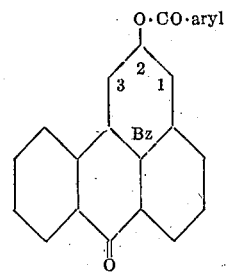

wherein aryl stands for an aryl group the hydrogen atoms of which may be substituted.

6. In a process of preparing derivatives of dibenzpyrenequinone, the step which comprises treating with an acid condensing agent at an elevated temperature a compound of the following formula:

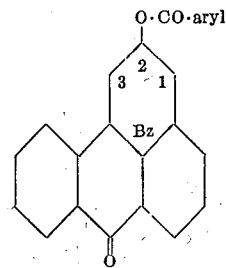

wherein aryl stands for an aryl group the hydrogen atoms of which may be substituted.

7. In a process of preparing derivatives of dibenzpyrenequinone, the step which comprises treating with an acid condensing agent a compound of the following formula:

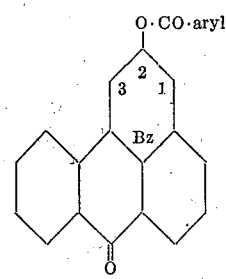

wherein aryl stands for an aryl group the hydrogen atoms of which may be substituted, and further treating with an alkylating agent the primarily formed derivative of dibenzpyrenequinone.

8. In a process of preparing derivatives of dibenzpyrenequinone, the step which comprises treating with an acid condensing agent at an elevated temperature a compound of the following formula:

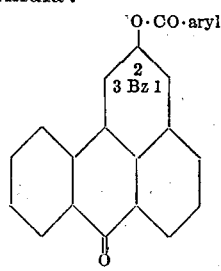

wherein aryl stands for an aryl group the hydrogen atoms of which may be substituted, and further treating with an alkylating agent the primarily formed derivative of dibenzpyrenequinone.

9. In a process of preparing derivatives of dibenzpyrenequinone, the step which comprises treating with an acid condensing agent a compound of the following formula:

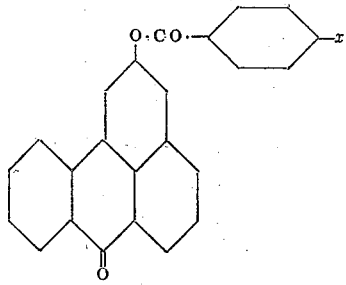

wherein $x$ stands for hydrogen or a methyl group.

10. In a process of preparing derivatives of dibenzpyrenequinone, the step which comprises treating with an acid condensing agent at an elevated temperature a compound of the following formula:

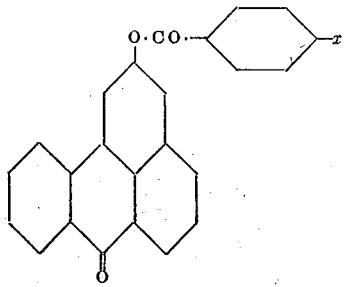

wherein $x$ stands for hydrogen or a methyl group.

11. In a process of preparing derivatives of dibenzpyrenequinone, the step which comprises treating with an acid condensing agent a compound of the following formula:

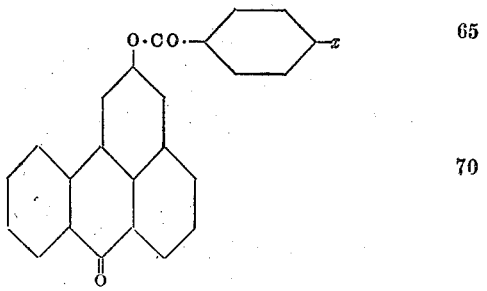

wherein $x$ stands for hydrogen or a methyl group, and further treating with an alkylating agent the primarily formed derivative of dibenzpyrenequinone.

12. In a process of preparing derivatives of dibenzpyrenequinone, the step which comprises treating with an acid condensing agent at an elevated temperature a compound of the following formula:

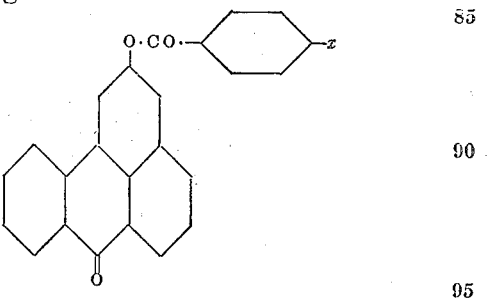

wherein $x$ stands for hydrogen or a methyl group, and further treating with an alkylating agent the primarily formed derivative of dibenzpyrenequinone.

13. In a process of preparing derivatives of dibenzpyrenequinone, the step which comprises treating with an acid condensing agent a compound of the following formula:

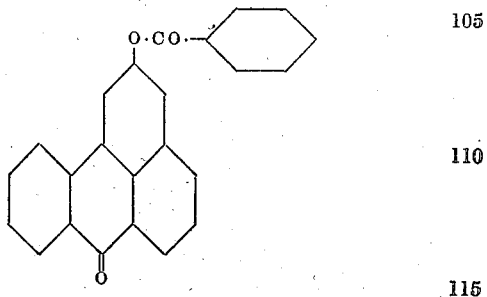

14. In a process of preparing derivatives of dibenzpyrenequinone, the step which comprises treating with an acid condensing agent at an elevated temperature a compound of the following formula:

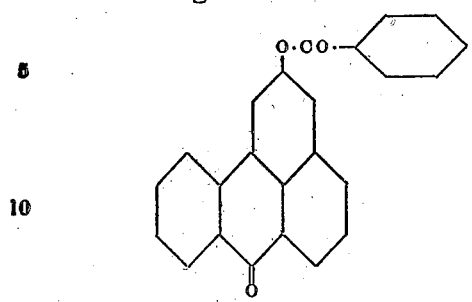

15. In a process of preparing derivatives of dibenzpyrenequinone, the step which comprises treating with an acid condensing agent a compound of the following formula:

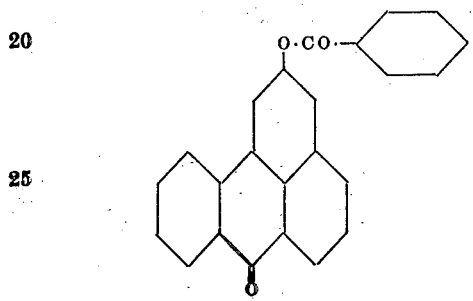

and further treating with an alkylating agent the primarily formed 1-hydroxy-3.4.8.9-dibenzpyrenequinone.

16. In a process of preparing derivatives of dibenzpyrenequinone, the step which comprises treating with an acid condensing agent at an elevated temperature a compound of the following formula:

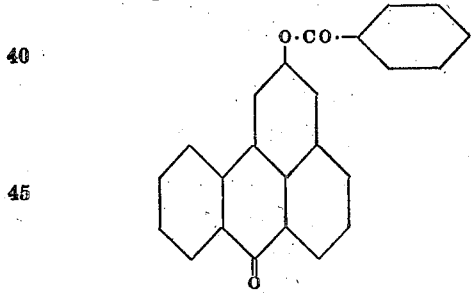

and further treating with an alkylating agent the primarily formed 1-hydroxy-3.4.8.9-dibenzpyrenequinone.

17. As new products, compounds of the following formula:

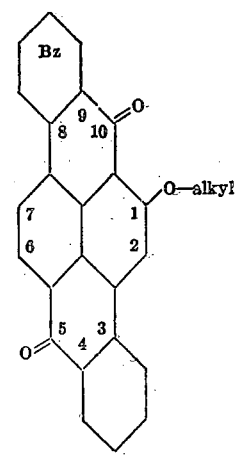

wherein the hydrogen atoms of the Bz-nucleus may be substituted, said compounds being rather difficultly soluble in organic solvents to a yellowish-brown solution in concentrated sulfuric acid to a bluish-red solution, and giving cherry-red vats which dye cotton fast yellow tints.

18. As new products compounds of the following formula:

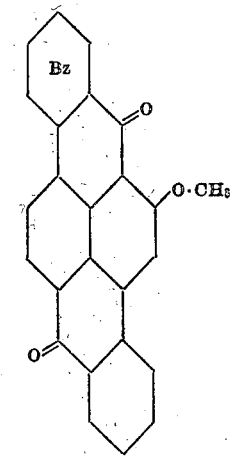

wherein the hydrogen atoms of the Bz-nucleus may be substituted, said compounds being rather difficultly soluble in organic solvents to a yellowish-brown solution in concentrated sulfuric acid to a bluish-red solution and giving cherry-red vats which dye cotton yellow tints.

19. As new products, compounds of the following formula:

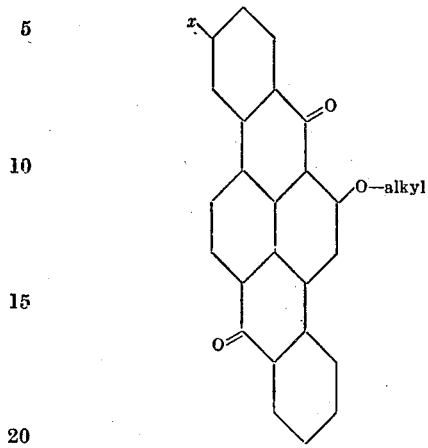

wherein $x$ stands for hydrogen or an alkyl group, said compounds being rather difficultly soluble in organic solvents to a yellowish-brown solution in concentrated sulfuric acid to a bluish-red solution, and giving cherry-red vats which dye cotton fast yellow tints.

20. As new products, compounds of the following formula:

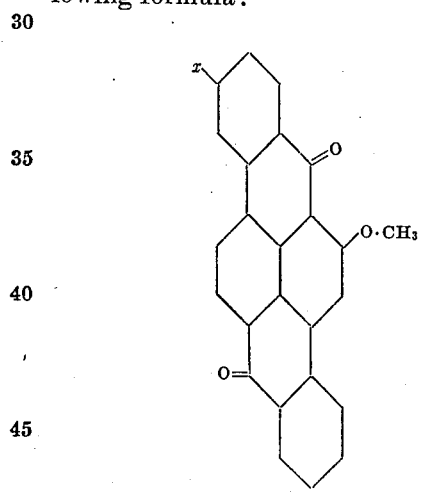

wherein $x$ stands for hydrogen or an alkyl group, said compounds being rather difficultly soluble in organic solvents to a yellowish-brown solution in concentrated sulfuric acid to a bluish-red solution, and giving cherry-red vats which dye cotton fast yellow tints.

21. As new products, compounds of the following formula:

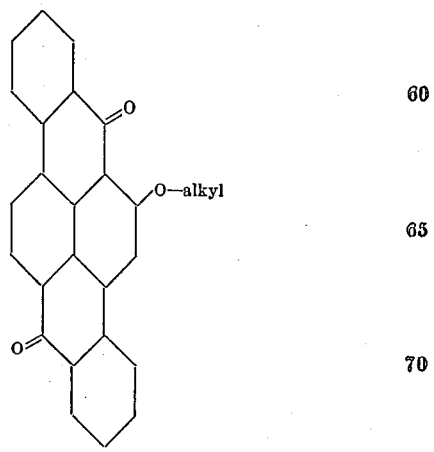

said compounds being rather difficultly soluble in organic solvents to a yellowish-brown solution in concentrated sulfuric acid to a bluish-red solution, and giving cherry-red vats which dye cotton fast yellow tints.

22. As a new product, the compound of the following formula:

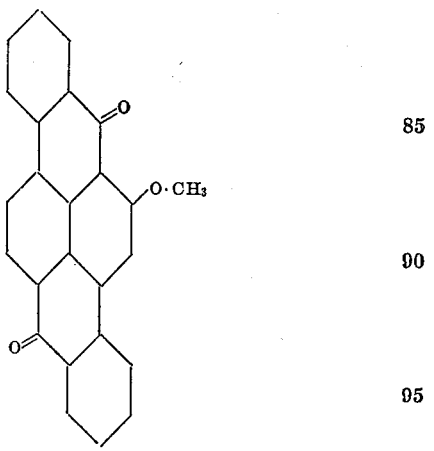

said compound being rather difficultly soluble in organic solvents to a yellowish-brown solution in concentrated sulfuric acid to a bluish-red solution, and giving a cherry-red vat which dyes cotton fast yellow tints.

In testimony whereof, we affix our signatures.

GEORG KRÄNZLEIN.
KARL ZAHN.
PAUL OCHWAT.
MARTIN CORELL.